Aug. 28, 1951  A. R. MARSCHKE  2,565,869
WHEELED JACK DOLLY
Filed March 3, 1948

INVENTOR
AUGUST R. MARSCHKE
BY *Williamson & Williamson*
ATTORNEYS

Patented Aug. 28, 1951

2,565,869

UNITED STATES PATENT OFFICE 2,565,869

WHEELED JACK DOLLY

August R. Marschke, Fargo, N. Dak.

Application March 3, 1948, Serial No. 12,849

1 Claim. (Cl. 254—2)

This invention relates to vehicle jacks and particularly to a wheeled dolly for supporting large vehicle wheels to facilitate mounting of the same on a vehicle and removal of the same therefrom.

Present day trucks and busses and other large vehicles have large and extremely heavy tires mounted on heavy wheels which are cumbersome and very difficult to handle. These wheels may be either dual wheels or merely large single wheels which must be removed whenever the tire is to be repaired and it is generally a job for more than one man to handle these large wheels and tires.

It is an object of my invention to provide a wheeled jack dolly adapted to be placed under a vehicle wheel to support the same and permit the wheel to be easily moved from one position to another for servicing thereof.

More specifically it is an object to provide a wheeled dolly having a pair of horizontally spaced wheel engaging elements and means for controllably varying the spaced relation between said elements to permit the elevation of the wheel center to be varied relative said elements.

It is another object of my invention to provide a new method for removing and mounting large wheels on a vehicle.

These and other objects and advantages of my invention will more fully appear from the following description made in connection with the accompanying drawings wherein like reference characters refer to similar parts throughout the several views and in which.

Figure 1:
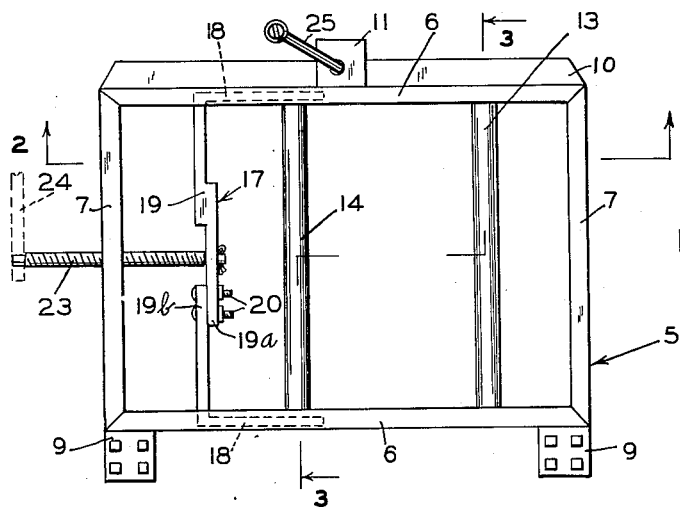
Fig. 1 is a top plan view of my wheeled jack dolly.
Figure 2:
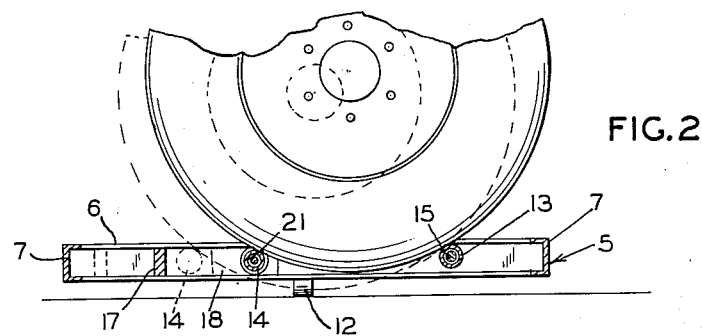
Fig. 2 is a longitudinal vertical sectional view taken substantially along the line 2—2 of Fig. 1 and showing the wheel supported thereon in raised mounting position in full lines and in lowered position in dotted lines.

As shown in the accompanying drawings I provide a wheeled jack dolly having a rigid box frame 5 made as from channel members forming the sides 6 and ends 7 integrally welded together to form a rigid structure. A pair of caster wheels 8 are mounted on suitable angle brackets 9 which are fixed to the outer end portions of one of the side channels 6 and one leg of these angle brackets 9 to which the caster wheels 8 are connected extends outwardly from said channels 6. The other channel 6 has a plate 10 welded thereto and a suitable bracket 11 fixed thereto with a diagonal brace 11a supporting the outwardly extending end portion of said bracket 11. An elevating caster wheel 12 is mounted on the lower extremity of the vertically disposed threaded shank 25a of a crank 25. The bracket 11 has a vertically disposed tapped aperture adapted to receive the threaded shank 25a of crank 25 and to cooperate therewith to adjustably project or retract said caster wheel 12.

Figure 3:
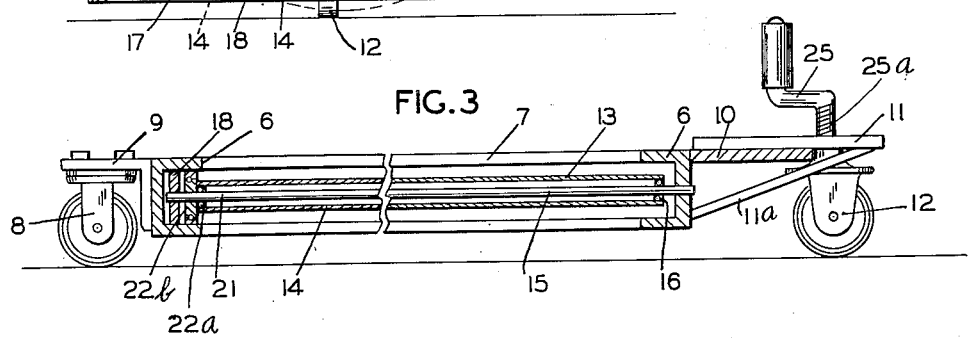
Fig. 3 is a transverse vertical sectional view taken substantially along the broken line 3—3 of Fig. 1 and showing the detail of the roller mountings.

A pair of wheel engaging rollers 13 and 14 are journaled on said side channels 6 and horizontally traverse the same in horizontally opposed relation. The roller 13 has a rod 15 concentrically extending therethrough. This rod 15 is mounted in the vertically upstanding side portions of side channels 6 as best shown in Fig. 3. The end portions of roller 13 have a pair of bearings 16 respectively interposed between said roller 13 and said rod 15 to permit said roller 13 to freely rotate on its longitudinal axis.

A suitable sliding carriage 17 has a pair of transversely opposed horizontally extending slides 18 which are shiftably mounted between the outstanding legs of said side channels 6. A transversely disposed cross member 19 is interposed between said slides 18 with the ends of said cross member respectively fixed to said slides 18. The cross member 19 is longitudinally adjustable and has a plurality of apertures in the overlapping intermediate portions 19a and 19b with a pair of removable bolts 20 adapted to be inserted through two selected pairs of aligned apertures. This longitudinal adjustment of cross member 19 permits the sliding elements 18 to be removably retained within the opposed side channels 6. An axle rod 21 is concentrically inserted through roller 14 and has its end extremities mounted in suitable cooperating apertures in slides 18. A pair of suitable bearings 22a are interposed between the respective end portions of roller 14 and rod 21 to permit said roller to freely rotate thereon. A second pair of bearings 22b are respectively interposed between the end portions of rod 21 and the respective outstanding legs of side channels 6 to permit said slides 18 and roller 14 to be easily shifted on said channels 6 relative to roller 13. A slide shifting element such as the control jack screw 23 threadably mounted through the end channel 7 adjacent cross member 19 is swivelly connected to the central portion of cross member 19 to permit said cross member and slides 18 connected therewith to be shifted relative to said roller 13. The outer end of jack screw 23 is adapted to receive a turning lever 24 to controllably turn said screw 23.

The following is a description of the operation of my improved dolly disclosing a new method for both the removal and mounting of wheels on a vehicle. For the removal of a vehicle wheel the wheel is initially jacked up in the conventional manner and the dolly rolled thereunder with the rollers 13 and 14 aligned with the axle of the wheel. The vehicle jack is then lowered slightly and the jack screw 23 is turned to project the shiftable carriage 17 and roller 14 toward roller 13 to reduce the spaced relation therebetween and bring the rollers into contact with the periphery of the wheel. The screw 23 is then further taken up to support the weight of the wheel and tire unit per se with the conventional jack supporting the weight of the vehicle. This adjustment of the screw 23 is very accurate and is in the nature of a micrometer adjustment whereas merely lowering the jack would put all the vehicle weight on the dolly. After removal of the bolts, nuts or other wheel retaining means and the wheel and tire unit are free of the vehicle the dolly with the wheel supported thereon is pulled out axially away from the vehicle and thereafter the wheel and tire carried on the dolly moved to any convenient position for repair thereof. After the repair of the tire or the mounting of a new tire on to the wheel rim the wheel unit is then rolled on to the jack dolly and easily moved back to be remounted on to the vehicle. At this time the problem arises in aligning the respective apertures and bolts which retain the wheel in position. My jack dolly easily solves this problem by permitting the elevation of the wheel unit to be varied by varying the spaced relation between the rollers 13 and 14. Also by providing the freely rotatable rollers 13 and 14 it is a simple matter to slightly rotate the wheel unit carried thereon and thus align the cooperating bolts with their respective apertures. The bearings 16 and 22a respectively permit said rollers 13 and 14 to freely rotate about the rods 15 and 21 respectively. The adjustable caster 12 is provided to permit leveling of the frame to facilitate the moving of the wheel unit by said dolly jack.

A new method for the removal of wheels from vehicles has been provided consisting in initially elevating the wheel to be removed, thereafter rolling my jack dolly thereunder and slightly lowering the wheel to permit engagement of the rollers with the tire, supporting the weight of the wheel unit per se on the dolly by reducing the spaced relation between the rollers 13 and 14, disconnecting the wheel from the vehicle and final removal of the supported wheel unit by rolling the dolly away from the vehicle.

Also a new method for mounting a wheel unit on to a vehicle has been provided, said method consisting in initially mounting the wheel unit in upstanding position on said spaced rollers 13 and 14 and moving said wheel unit into position to be mounted on the vehicle and thereafter adjusting said position of the wheel unit by varying the spacing between the rollers and slightly rotating the wheel unit on said rollers to align the respective apertures and bolts to permit the bolts to be received by said apertures and secured to said wheel unit to retain the same on said vehicle and thereafter raising said vehicle wheel by a conventional jack to permit the dolly to be rolled out from under said wheel and finally lowering said vehicle wheel into ground engagement.

It will be seen that I have provided an extremely simple, highly efficient device for supporting large vehicle wheels and permitting the same to be easily moved from one position to another. Also from the foregoing description of the operation and method of handling these wheels, it will be apparent that I have provided a new method for removal, supporting or mounting of large vehicle wheels.

It will, of course, be understood that various changes may be made in the form, details, arrangement and proportions of the parts without departing from the scope of my invention.

What I claim is:

A wheeled jack dolly comprising a main rigid substantially rectangularly shaped frame composed of channel members of similar size in cross-section and disposed with the channels thereof facing inwardly, a shaft disposed transversely of said main frame fixedly mounted on the webs of the side channels of the main frame, a wheel supporting roller rotatably mounted on said shaft with the ends of the roller disposed within the said side channel members of the frame, a rigid substantially U-shaped frame movable longitudinally of the main frame, the legs of said movable U-shaped frame being of substantial length and confined and slidably mounted within the oppositely disposed inwardly facing side channel members of the frame and acting therewith as guiding means for the longitudinally movable U-shaped frame, a wheel engaging and supporting roll rotatably mounted on the respective legs of said longitudinally movable U-shaped frame adjacent the free ends of the legs to extend at a right angle thereto and parallel with the first mentioned roller, a single longitudinally extending threaded thrust imparting member threadedly mounted on and extending through one end of the main frame centrally thereof to screw threadedly and rotatably move relatively thereto, the inner end of said screw member being journaled in the base of said longitudinally movable U-shaped frame substantially centrally thereof, said screw member being disposed at substantially right angles with respect to the base of the longitudinally movable U-shaped frame and substantially parallel with the opposed side channel members of the main frame, the screw member when rotated serving to directly impart a longitudinal thrust to and move said longitudinally movable U-shaped frame to carry the wheel supporting roller mounted thereon toward and away from the first mentioned roller.

AUGUST R. MARSCHKE.

REFERENCES CITED

The following references are of record in the file of this patent:

UNITED STATES PATENTS

| Number | Name | Date |
| --- | --- | --- |
| 1,847,382 | Collins | Mar. 1, 1932 |
| 2,380,415 | Carruthers | July 31, 1945 |
| 2,392,409 | Ray | Jan. 8, 1946 |